(12) United States Patent
Engstrom (10) Patent No.: US 9,447,586 B2
(45) Date of Patent: *Sep. 20, 2016

(54) JOINT FOR PANELS

(71) Applicant: PERGO (EUROPE) AB, Trelleborg (SE)

(72) Inventor: Nils-Erik Engstrom, Trelleborg (SE)

(73) Assignee: PERGO (EUROPE) AB, Trelleborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/957,971

(22) Filed: Aug. 2, 2013

(65) Prior Publication Data

US 2014/0033630 A1    Feb. 6, 2014

Related U.S. Application Data

(62) Division of application No. 11/242,127, filed on Oct. 4, 2005, now Pat. No. 8,516,767.

(30) Foreign Application Priority Data

Jul. 11, 2005  (SE) .................................. 0501639-9

(51) Int. Cl.
*E04F 15/02*  (2006.01)
*E04F 15/04*  (2006.01)
(Continued)

(52) U.S. Cl.
CPC ........... *E04F 15/02038* (2013.01); *E04B 5/00* (2013.01); *E04C 2/20* (2013.01);
(Continued)

(58) Field of Classification Search
CPC . E04F 15/02; E04F 15/04; E04F 2201/0552; E04F 2201/0558; E04F 2201/0594; E04F 2201/0123; E04F 2201/02; E04F 2201/0523; E04F 2201/021; E04F 2201/0517; E04F 2201/0115; E04F 2201/0138; E04B 5/00
USPC .................................. 52/582.1, 586.1, 591.5
See application file for complete search history.

(56) References Cited

U.S. PATENT DOCUMENTS 714,987 A    12/1902  Wolfe
2,004,193 A   6/1935  Cherry
(Continued)

FOREIGN PATENT DOCUMENTS

BE    1010487        12/1999
BE    1010487 A6     12/1999
(Continued)

OTHER PUBLICATIONS

Pending U.S. Appl. No. 09/672,077.
(Continued)

*Primary Examiner* — Elizabeth A Quast
*Assistant Examiner* — Kyle Walraed-Sullivan
(74) *Attorney, Agent, or Firm* — Jenkins, Wilson, Taylor & Hunt, P.A.

(57) ABSTRACT

A joint (1) having a first edge (2) and a second edge (3), the first edge (2) being provided with a distal edge (21) and a downwards protruding heel (22). The distal edge (21) is further provided with an upper joint edge (25) beneath which a groove (23) is arranged. The second edge (3) is provided with lower cheek (31) having a distal end (32) at which an upwards protruding lower cheek heel (33) is arranged. The second edge (3) is further provided with an upper joining edge (35) beneath which an undercut (34) is arranged. A moveable locking element (40) is arranged in the space created by the undercut (34). The moveable locking element (40) have a locking tongue (41), a locking tongue leg (42) and a maneuvering leg (43).

10 Claims, 10 Drawing Sheets

(51) Int. Cl.
  *E04B 5/00* (2006.01)
  *F16B 5/00* (2006.01)
  *E04C 2/20* (2006.01)
  *E04C 2/38* (2006.01)

(52) U.S. Cl.
  CPC .............. *E04C 2/38* (2013.01); *E04F 15/02* (2013.01); *F16B 5/0056* (2013.01); *E04F 2201/0115* (2013.01); *E04F 2201/0138* (2013.01); *E04F 2201/0552* (2013.01)

(56) References Cited

U.S. PATENT DOCUMENTS

| | | | |
|---|---|---|---|
| 2,740,167 A | 4/1956 | Rowley | |
| 3,444,660 A | 5/1969 | Feichter | |
| 3,479,784 A | 11/1969 | Massagli | |
| 3,553,919 A | 1/1971 | Omholt | |
| 3,720,027 A | 3/1973 | Christensen | |
| 3,731,445 A | 5/1973 | Hoffmann | |
| 3,798,111 A | 3/1974 | Lane | |
| 3,807,113 A | 4/1974 | Turner | |
| 3,859,000 A | 1/1975 | Webster | |
| 3,921,312 A | 11/1975 | Fuller | |
| 4,426,820 A | 1/1984 | Terbrack | |
| 4,449,346 A | 5/1984 | Tremblay | |
| 4,940,503 A | 7/1990 | Lindgren | |
| 5,092,095 A | 3/1992 | Zadok | |
| 5,117,603 A | 6/1992 | Weintraub | |
| 5,148,850 A | 9/1992 | Urbanick | |
| 5,216,861 A | 6/1993 | Meyerson | |
| 5,295,341 A | 3/1994 | Kajiwara | |
| 5,325,649 A | 7/1994 | Kajiwara | |
| 5,344,700 A | 9/1994 | McGath | |
| 5,348,778 A | 9/1994 | Knipp | |
| 5,502,939 A | 4/1996 | Zadok | |
| 5,527,128 A | 6/1996 | Rope | |
| 5,630,304 A | 5/1997 | Austin | |
| 5,706,621 A | 1/1998 | Pervan | |
| 5,791,114 A | 8/1998 | Mandel | |
| 5,797,237 A | 8/1998 | Finkell | |
| 5,860,267 A | 1/1999 | Pervan | |
| 5,907,934 A | 6/1999 | Austin | |
| 5,971,655 A | 10/1999 | Shirakawa | |
| 6,006,486 A | 12/1999 | Moriau | |
| 6,023,907 A | 2/2000 | Pervan | |
| 6,094,882 A | 8/2000 | Pervan | |
| 6,101,778 A | 8/2000 | Martensson | |
| 6,182,410 B1 | 2/2001 | Pervan | |
| 6,205,639 B1 | 3/2001 | Pervan | |
| 6,209,278 B1 | 4/2001 | Tychsen | |
| 6,216,409 B1 | 4/2001 | Roy | |
| 6,314,701 B1 | 11/2001 | Meyerson | |
| 6,324,803 B1 | 12/2001 | Pervan | |
| 6,332,733 B1* | 12/2001 | Hamberger et al. | 403/329 |
| 6,397,547 B1 | 6/2002 | Martensson | |
| 6,418,683 B1 | 7/2002 | Martensson | |
| 6,421,970 B1 | 7/2002 | Martensson | |
| 6,438,919 B1 | 8/2002 | Knauseder | |
| 6,647,690 B1* | 11/2003 | Martensson | 52/601 |
| 6,763,643 B1 | 7/2004 | Martensson | |
| 6,769,835 B2* | 8/2004 | Stridsman | 404/41 |
| 6,854,235 B2* | 2/2005 | Martensson | 52/601 |
| 6,898,913 B2* | 5/2005 | Pervan | E04F 15/02 52/589.1 |
| 6,966,161 B2 | 11/2005 | Palsson | |
| 7,841,144 B2* | 11/2010 | Pervan | 52/395 |
| 2003/0009972 A1* | 1/2003 | Pervan et al. | 52/582.1 |

FOREIGN PATENT DOCUMENTS

| | | |
|---|---|---|
| DE | 2159042 | 6/1973 |
| DE | 2238660 | 2/1974 |
| DE | 3343601 A1 | 2/1974 |
| DE | 3343601 | 6/1985 |
| GB | 812671 | 4/1959 |
| GB | 1348272 | 3/1974 |
| GB | 1430423 | 3/1976 |
| GB | 2256023 | 11/1992 |
| GB | 2256023 A | 11/1992 |
| JP | 3169967 | 7/1991 |
| SE | 501014 | 10/1994 |
| SE | 502994 | 3/1996 |
| WO | 9313280 | 7/1993 |
| WO | WO96/27719 | 9/1996 |
| WO | 9747834 | 12/1997 |
| WO | 9966151 | 12/1999 |
| WO | 0063510 | 10/2000 |
| WO | WO2006/043893 | 4/2006 |
| WO | WO2008/004960 A2 | 1/2008 |

OTHER PUBLICATIONS

Pending U.S. Appl. No. 09/988,014.
Pending U.S. Appl. No. 09/770,395.
Pending U.S. Appl. No. 10/158,945.
Pending U.S. Appl. No. 09/672,076.
Valinge Innovation AB; "Choosing the Locking System".
U.S. Appl. No. 60/869,181, Pervan.

\* cited by examiner

JOINT FOR PANELS

CROSS REFERENCE TO RELATED APPLICATIONS

This application is a divisional of Ser. No. 11/242,127, flied Oct. 4, 2005; claiming the benefit of Swedish Application No. 0501639-9, filed Jul. 11, 2005, the entire disclosures of which are incorporated herein by reference.

BACKGROUND OF THE INVENTION

1. Field of the Invention

The present invention relates to a joint used for connecting panels.

2. Description of related Prior Art

Prefabricated floor boards provided with tongue and groove at the edges are quite common nowadays. These can be installed by the average handy man as they are very easy to install. Such floors can, for example, be constituted of solid wood, fibre board or particle board. These are most often provided with a surface layer such as lacquer, or some kind of laminate. The boards are most often installed by being glued via tongue and groove. The most common types of tongue and groove are however burdened with the disadvantage to form gaps of varying width between the floor boards in cases where the installer hasn't been thorough enough. Dirt will easily collect in such gaps. Moisture will furthermore enter the gaps which will cause the core to expand in cases where it is made of wood, fibre board or particle board, which usually is the case. The expansion will cause the surface layer to rise closest to the edges of the joint which radically reduces the useful life of the floor since the surface layer will be exposed to an exceptional wear. Different types of tensioning devices, forcing the floor boards together during installation can be used to avoid such gaps. This operation is however more or less awkward. It is therefore desirable to achieve a joint which is self-guiding and thereby automatically finds the correct position. Such a joint would also be possible to utilise in floors where no glue is to be used. Different types of joint with mechanical locking have been made available. These are commonly known as click joints or snap-action joints and they rely on resilient action in upper and/or lower cheeks of the groove portion of the joint. It is very common to use fibre board or particle board as core material and the resilient properties of these materials are somewhat limited. It is therefore the object of the present invention to work around the problem by not completely relying on the limited resiliency allowed by the core material.

SUMMARY OF THE INVENTION

It has through the present invention been made possible to improve the assembly procedure as well as achieving an improved locking between panels. Accordingly the invention relates to a joint having a first edge and a second edge. The first edge is provided with a distal edge and a downwards protruding heel. The distal edge is further provided with an upper joint edge beneath which a groove is arranged. The second edge is provided with lower cheek having a distal end at which an upwards protruding lower cheek heel is arranged. The second edge is further provided with an upper joining edge beneath which an undercut is arranged. The invention is characterised in a moveable locking element is arranged in the space created by the undercut. The moveable locking element has a locking tongue, a locking tongue leg and a maneuvering leg. The second edge is intended to join with the first edge through vertical motion. The moveable locking element, or more precisely the locking tongue of the locking element, will be displaced by the vertical motion when the two edges are moved towards each other, The displacement can be seen as a rotation where the locking tongue is brought to rotate around a selected pivot point. Resilient action may also realise this rotating action.

According to a preferred embodiment of the invention the downwards protruding heel presses on the maneuvering leg, thereby urging the locking tongue to move forward and engage the groove. An upper locking surface of the locking tongue is suitably longer than the portion of the locking tongue that can engage the groove.

The lower cheek heel suitably have a front face and that the downwards protruding heel have a rear face. The front face and the rear face are then preferably intended to interact, the interaction resulting in the upper joint edge and the upper joining edge being urged together in an assembled joint.

According to one alternative embodiment of the invention the lower cheek heel suitably have a front face and the downwards protruding heel have a rear face while the maneuvering leg have a face section. The front face and the rear face are then preferably intended to interact, having the face section in an intermediate position, the interaction resulting in the upper joint edge and the upper joining edge being urged together in an assembled joint.

According to one special embodiment of the invention the locking element is provided with a hinge. This will allow a snap-action cam lock effect A moveable locking element like described in the present invention may suitably be made through extrusion moulding and it can be made of thermoplastic material, thermosetting material or even of metal.

The invention also relates to a joint having a first edge and a second edge where the first edge is provided with a tongue and a rear groove. The second edge is provided with a lower cheek having a distal end, an inner locking groove, a tongue groove and a locking member surface. The invention is characterised in a moveable locking member is arranged on the locking member surface. The moveable locking member have an inner locking tongue, a maneuvering cheek and an outer locking tongue. The second edge is intended to join with the first edge through horizontal motion.

Suitably, a maneuvering area beneath the tongue presses on the maneuvering cheek urging the inner locking tongue to move downwards and engage the inner locking groove. The maneuvering area beneath the tongue suitably presses on the maneuvering cheek also urging the outer locking tongue to move upwards and engage the rear groove.

A moveable locking element like described in the present invention may suitably be made through extrusion moulding and it can be made of thermoplastic material, thermosetting material, a composite material or even of metal.

The joint of the present invention is suitably used on products such as floor panels or wall panels. According to an embodiment of a floor panel according to the present invention includes a core which is covered with an upper decorative surface. The core most often consists of wood particles or fibre bonded together with glue or resin. Such core boards are commonly known as Medium Density Fibre board (MDF), High Density Fibre board (HDF), Oriented Strand Board (OSB) or particle board. It is, however, also possible to utilise the invention on cores made of solid wood. Since wood based core materials are sensitive to moisture it may be advantageous to treat the area closest to the joint if the floor is to be exposed to moisture. This treatment may suitably include resin, wax or some kind of lacquer. It will not be necessary to treat the joint if the panels are to be glued since the glue itself will protect the joint from moisture penetration. The decorative upper surface may consist of a decorative paper possibly impregnated with melamine-formaldehyde resin. One or more layers of so called overlay paper of cellulose, impregnated with melaimine-formaldehyde resin is suitably placed on top of the decorative paper. One or more of the above layers may be sprinkled with hard particles, of for example aluminium oxide, silicon carbide or silicon oxide in connection to the impregnation in order to improve the abrasion resistance. The paper impregnated with resin is cured before, or in connection to applying it to the core. The paper layers are suitably laminated together before they are applied to the core in cases where the upper decorative surface is constituted by more than one paper layers. The lower side may suitably be coated with a lacquer or a resin impregnated paper. It is also possible to arrange an impregnated support paper between the decor and the core.

Among possible upper surfaces to apply to the core may be mentioned;

Thermosetting laminates including at least a decorative paper impregnated with melamine-formaldehyde resin. Overlay paper and hard particles may be added to this as described earlier in the present application.

The upper decorative surface may also be constituted by an acrylic foil, an acrylic lacquer and combinations thereof. It might also be constituted by a foil or a lacquer of poly olefins or poly olefin derivatives.

It is also possible to coat a decorative surface with an acrylic lacquer containing, or being sprinkled with, hard particles of α-aluminium oxide, silicon carbide or silicon oxide. The coating is most often achieved through use of a roller or through curtain coating. Among suitable acrylic lacquers can be mentioned radiation curing ones which are cured with electron beam or ultraviolet light forming free radicals in the uncured lacquer.

It is further possible to use wood veneer, most often coated with oil, wax or lacquer.

It has also shown that joints according to the present invention are well suited for other materials as well. It is for example possible to use the present invention on cores made of mineral based materials such as stone like marble, granite, slate, diabase, sandstone, limestone and the like but also ceramic, ceramic-like or composite materials like brick, concrete, fibre cement, glazed and non-glazed ceramic tiles. Some of these materials may be polished as the only surface treatment while glazing, painting or oil treatment is an example of other surface treatments possible to utilise on above mentioned core materials. It is of course also possible, as described together with wood based core materials, to arrange thermosetting laminates including at least a decorative paper impregnated with melamine-formaldehyde resin, Overlay paper and hard particles may be added to this as described earlier in the present application. The upper decorative surface may also be constituted by an acrylic foil, an acrylic lacquer and combinations thereof. It might also be constituted by a foil or a lacquer of poly olefins or poly olefin derivatives.

DETAILED DESCRIPTION OF EMBODIMENT EXAMPLES

The invention is further described together with drawing showing different embodiments of the invention whereby.

Figure 1A:
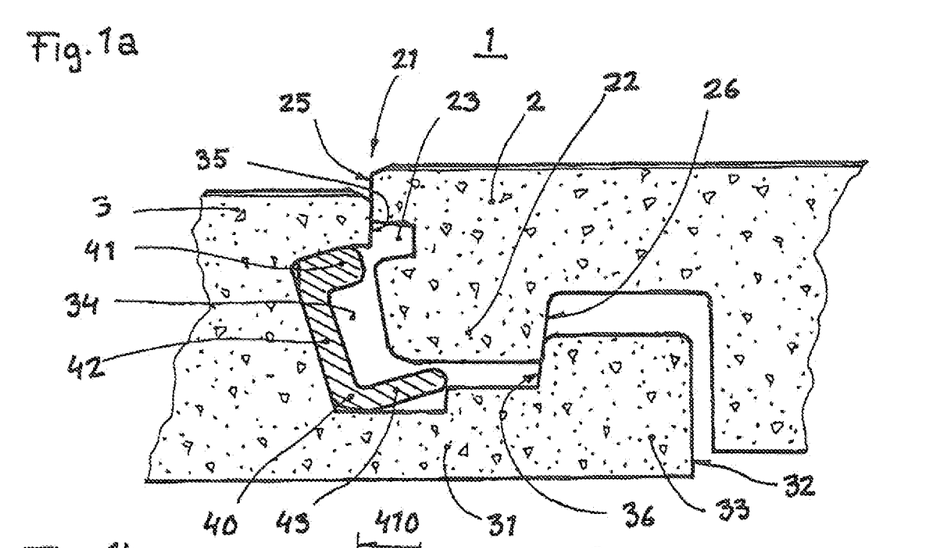
FIG. 1a-b shows a first embodiment of a joint 1 according to the invention.
Figure 1B:
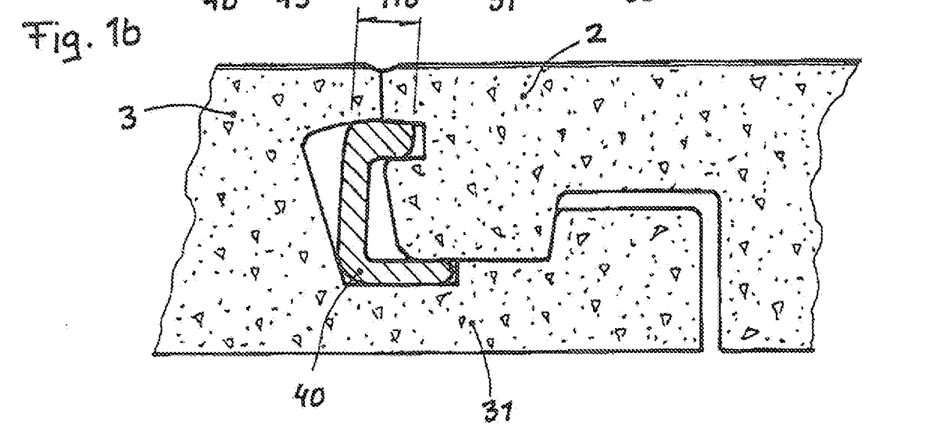

Accordingly FIG. 1a-b shows in cross-section a joint 1 having a first edge 2 and a second edge 3 according to a first embodiment of the invention. FIG. 1a shows the joint 1 just before the joining and FIG. 1b shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The second edge 3 is intended to join with the first edge 2 through vertical motion. The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 have a front face 36 while the downwards protruding heel 22 have a rear face 26. The front face 36 and the rear face 26 are intended to interact which is resulting in the upper joint edge 25 and the upper joining edge 35 being urged together in an assembled joint 1.

Figure 2A:
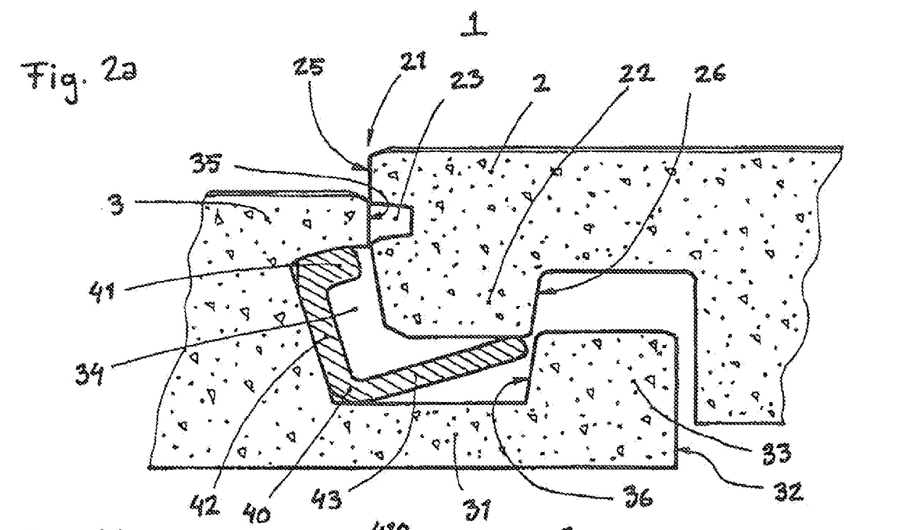
FIG. 2a-b shows a second embodiment of a joint 1 according to the invention.
Figure 2B:
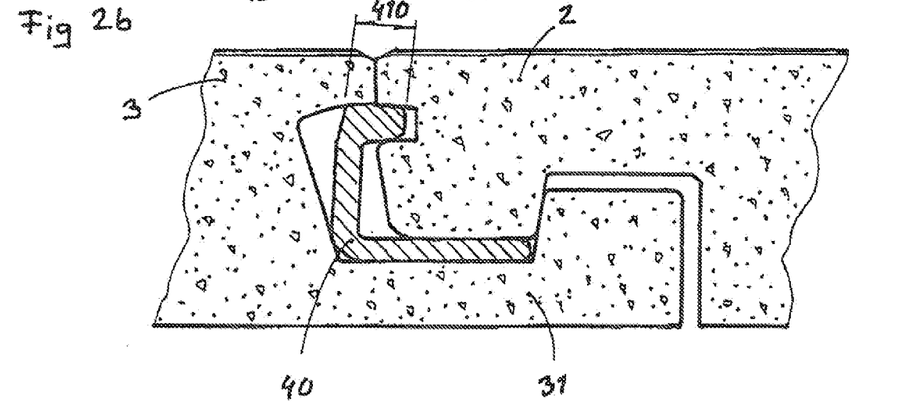

FIG. 2a-b shows, in cross-section, a joint 1 having a first edge 2 and a second edge 3 according to a second embodiment of the invention. FIG. 2a shows the joint 1 just before the joining and FIG. 2b shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43.

The second edge 3 is intended to join with the first edge 2 through vertical motion. The maneuvering leg 43 is here extended to increase the locking force. The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 have a front face 36 while the downwards protruding heel 22 have a rear face 26. The front face 36 and the rear face 26 are intended to interact which is resulting in the upper joint edge 25 and the upper joining edge 35 being urged together in an assembled joint 1.

Figure 3A:
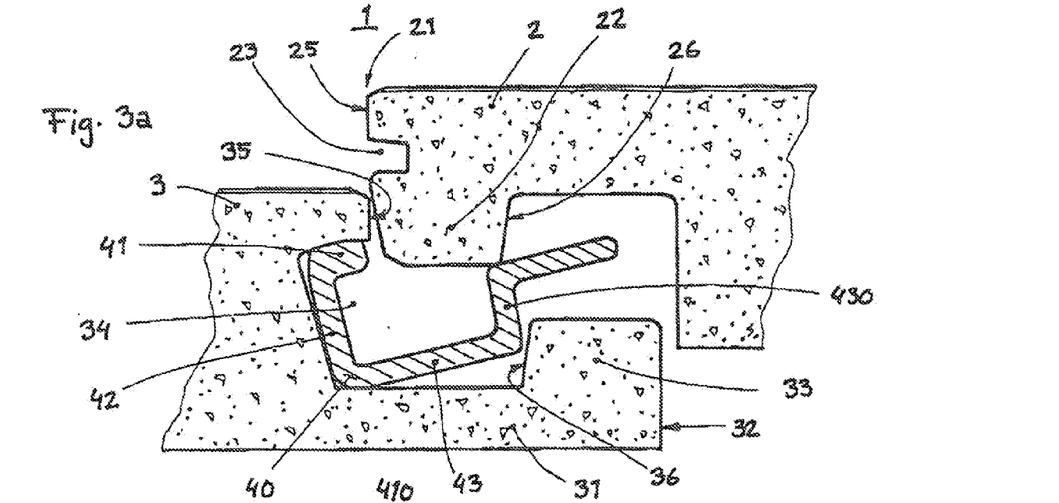
FIG. 3a-b shows a third embodiment of a joint 1 according to the invention.
Figure 3B:
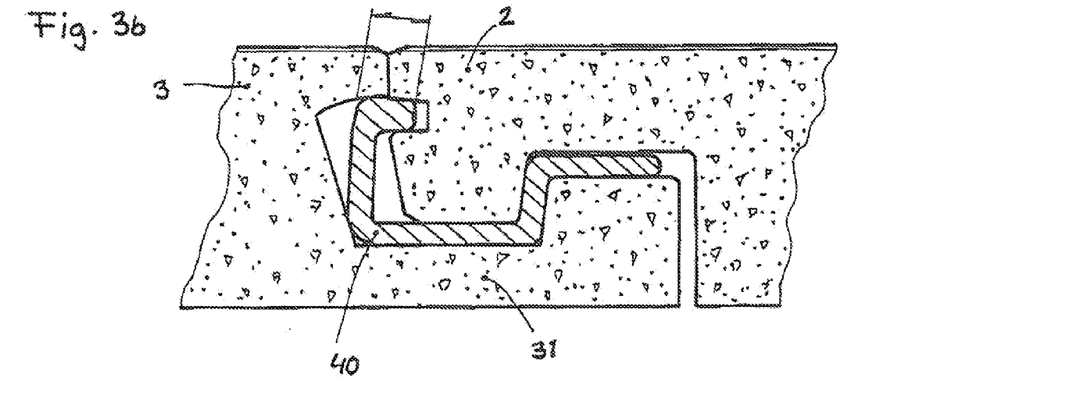

FIG. 3a-b shows, in cross-section, a joint 1 having a first edge 2 and a second edge 3 according to a third embodiment of the invention. FIG. 3a shows the joint 1 just before the joining and FIG. 3b shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The second edge 3 is intended to join with the first edge 2 through vertical motion. The maneuvering leg 43 is here extended further to increase the locking force. The downwards protruding heel 22 hereby presses on the maneuvering, leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 have a front face 36 while the downwards protruding heel 22 have a rear face 26. The lower cheek heel 33 have a front face 36 while the downwards protruding heel 22 have a rear face 26 and the maneuvering leg have a face section 430. The front face 36 and the rear face 26 are intended to interact, having the face section 430 in an intermediate position. The interaction results in the upper joint edge 25 and the upper joining edge 35 being urged together in an assembled joint 1.

Figure 4A:
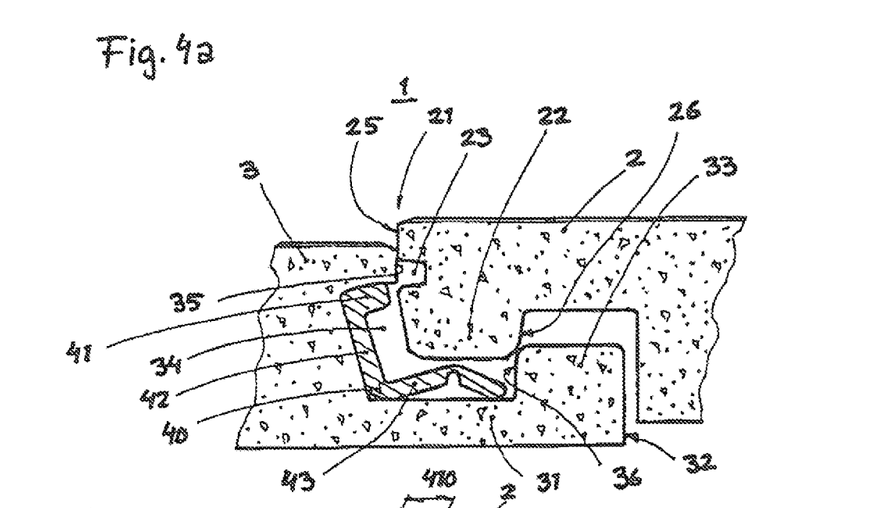
FIG. 4a-b shows a fourth embodiment of a joint 1 according to the invention.
Figure 4B:
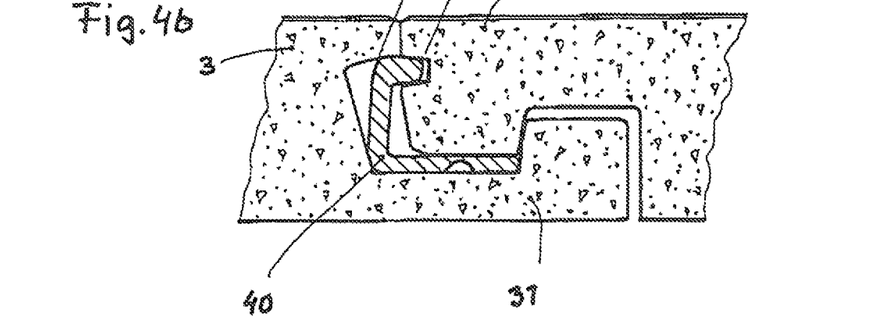

FIG. 4a-b shows in crass-section a joint 1 having a first edge 2 and a second edge 3 according to a fourth embodiment of the invention. FIG. 4a shows the joint 1 just before the joining and FIG. 4b shows the joint 1 after assembly. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The second edge 3 is intended to join with the first edge 2 through vertical motion. The maneuvering leg 43 is provided with a hinge which allows a cam lock effect.

The downwards protruding heel 22 hereby presses on the maneuvering leg 43 urging the locking tongue 41 to move forward and engage the groove 23. To ensure this, an upper locking surface 410 of the locking tongue 41 is longer than the portion of the locking tongue 41 that can engage the groove 23. The lower cheek heel 33 have a front face 36 while the downwards protruding heel 22 have a rear face 26. The front face 36 and the rear face 26 are intended to interact which is resulting in the upper joint edge 25 and the upper joining edge 35 being urged together in an assembled joint 1.

Figure 5A:
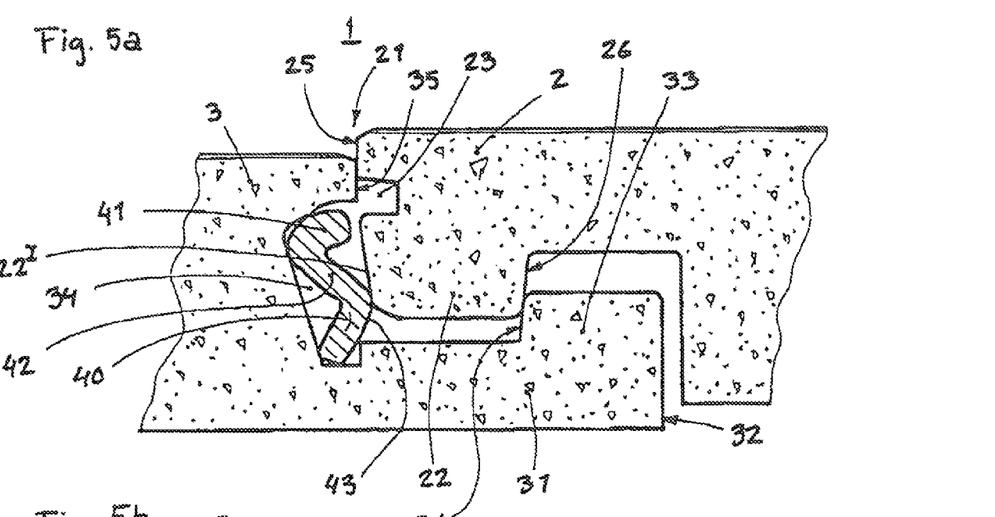
FIG. 5a-b shows a fifth embodiment of a joint 1 according to the invention.
Figure 5B:
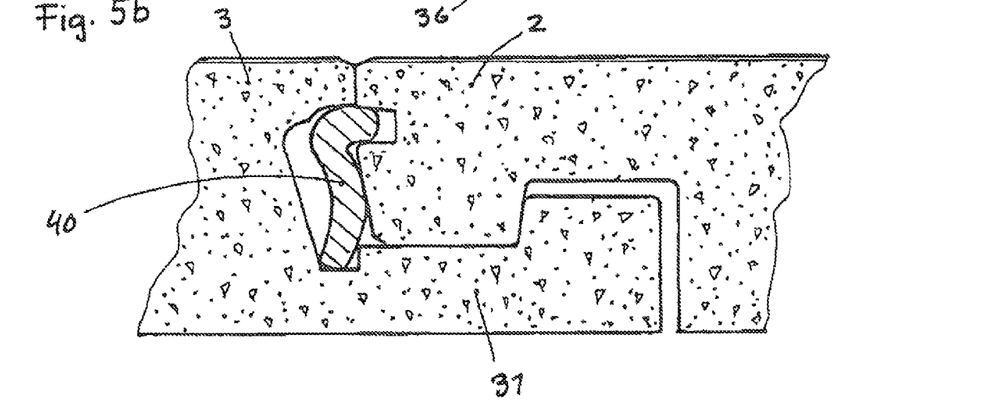

FIG. 5a-b shows in cross-section a joint 1 having a first edge 2 and a second edge 3 according to a fifth embodiment of the invention. FIG. 5a shows the joint 1 just before the joining and FIG. 5b shows the joint 1 after assembly. The fifth embodiment is an alternative embodiment of the invention. The first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The second edge 3 is intended to join with the first edge 2 through vertical motion. A front surface $22^1$ of the downwards protruding heel 22 hereby presses on the maneuvering leg 43 urging the bent maneuvering leg 43 to straighten whereby the locking tongue 41 moves forward and engage the groove 23. The lower cheek heel 33 have a front face 36 while the downwards protruding heel 22 have a rear face 26. The front face 36 and the rear face 26 are intended to interact which is resulting in the upper joint edge 25 and the upper joining edge 35 being urged together in an assembled joint 1.

Figure 6A:
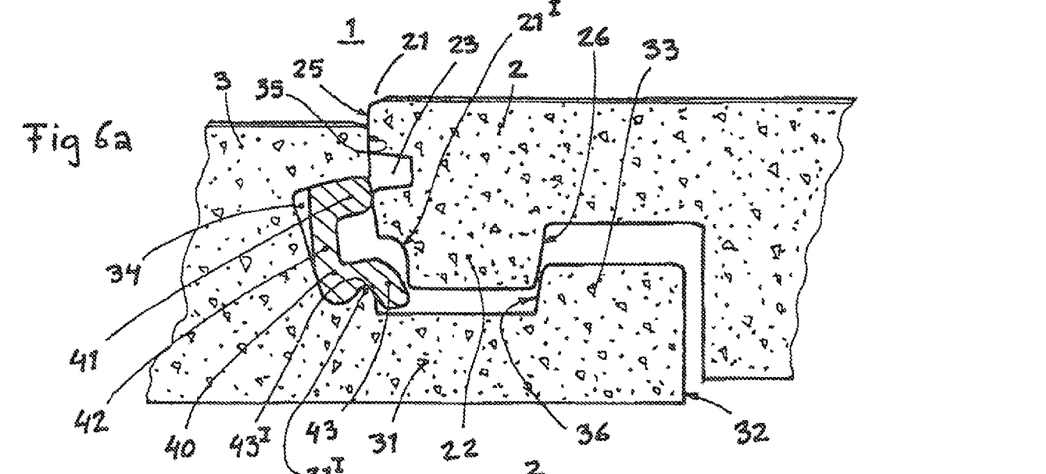
FIG. 6a-b shows a sixth embodiment of a joint 1 according to the invention.
Figure 6B:
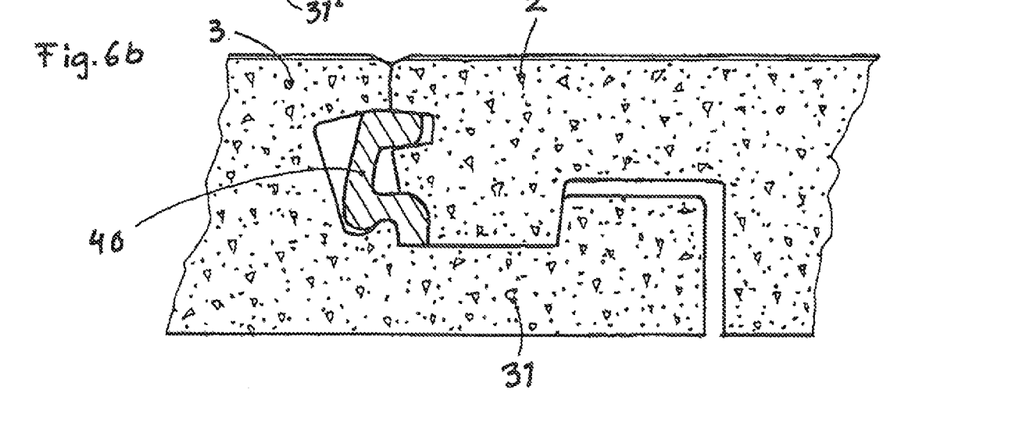
Figure 6C:
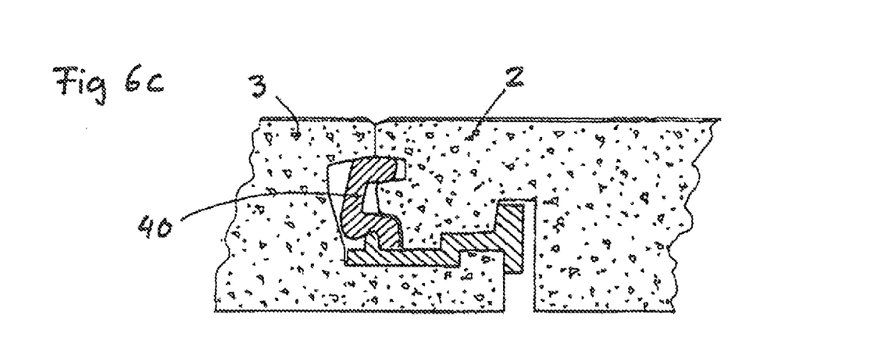
FIG. 6c shows an alternative version of the sixth embodiment shown in FIG. 6a-b of a joint 1 according to the invention

FIG. 6a-b shows in cross-section a joint 1 having a first edge 2 and a second edge 3 according to a sixth embodiment of the invention. FIG. 6a shows the joint 1 just before the joining and FIG. 6b shows the joint 1 after assembly. FIG. 6c shows an alternative embodiment of the embodiment shown in FIG. 6a-b. Beginning with FIG. 6a-b, the first edge 2 is provided with a distal edge 21 and a downwards protruding heel 22. The distal edge 21 is further provided with an upper joint edge 25 beneath which a groove 23 is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut 34. The moveable locking element 40 have a locking tongue 41, a locking tongue leg 42 and a maneuvering leg 43. The moveable locking element 40 is further provided with a pivot groove $43^1$. The lower cheek 31 is provided with a pivot edge $31^1$. The pivot groove $43^1$ and the pivot edge $31^1$ are intended to interact. The second edge 3 is intended to join with the first edge 2 through vertical motion.

A front surface $22^1$ of the downwards protruding heel 22 hereby presses on the maneuvering leg 43 urging the maneuvering leg 43 to tilt with the pivot edge $31^1$ as an axis of rotation whereby the locking tongue 41 moves forward and engage the groove 23. The lower cheek heel 33 have a front face 36 while the downwards protruding heel 22 have a rear face 26. The front face 36 and the rear face 26 are intended to interact which is resulting in the upper joint edge 25 and the upper joining edge 35 being urged together in an assembled joint 1. The lower cheek 31, the downwards protruding heal 22 and the maneuvering leg 43 are further designed so that the outermost portion of the maneuvering leg 43 is held in place by the downwards protruding heal 22 and the lower cheek 31 when the joint is assembled.

FIG. 6c mainly correspond to FIG. 6a-b above. The upper portion of the lower cheek 31 containing lower cheek heal 33, front face 36 and pivot edge $31^1$ is, however made of a separate material which is joined with the core material with for example glue. It is, however also possible to attach this portion by nailing, prizing or snapping it into position.

Figure 7A:
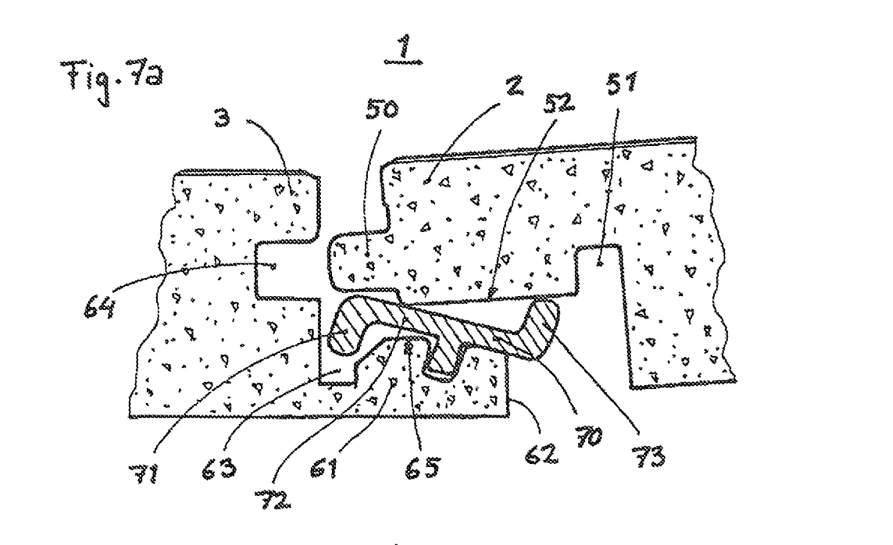
FIG. 7a-b shows a seventh embodiment of a joint 1 according to the invention.
Figure 7B:
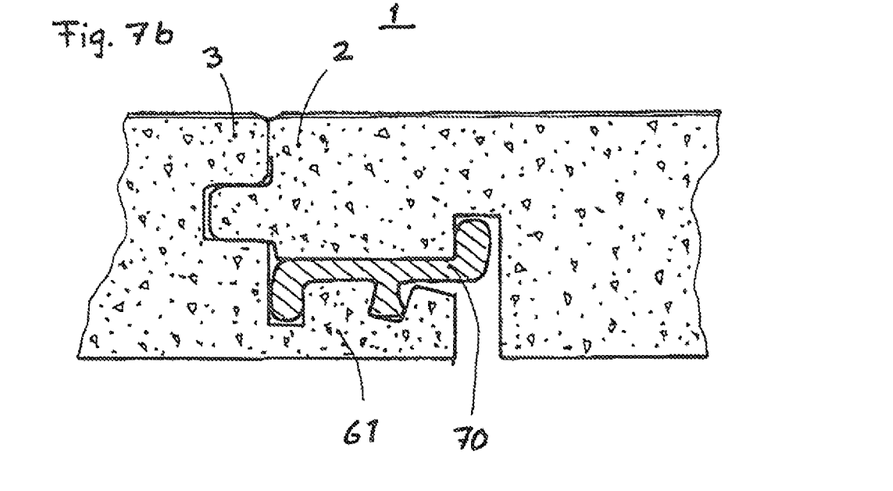

FIG. 7a-b shows in cross-section a joint 1 having a first edge 2 and a second edge 3 according to a seventh embodiment of the invention. FIG. 7a shows the joint 1 just before the joining and FIG. 7b shows the joint 1 after assembly. The seventh embodiment is an alternative embodiment of the invention where the joint is assembled through horizontal motion. The joint 1 have a first edge 2 and a second edge 3 wherein the first edge 2 is provided with a tongue 50 and a rear groove 51. The second edge 3 is provided with a lower cheek 61 having a distal end 62, an inner locking groove 63, a tongue groove 64 and a locking member surface 65. A moveable locking member 70 is arranged on the locking member surface 65. The moveable locking member 70 have an inner locking tongue 71, a maneuvering cheek 72 and an outer locking tongue 73. As said above the second edge 3 is intended to join with the first edge 2 through horizontal motion according to this, seventh embodiment of the invention. A maneuvering area 52 beneath the tongue 50 presses on the maneuvering cheek 72 urging the inner locking tongue 71 to move downwards and engage the inner locking groove 63. At the same time the outer locking tongue 72 will move upwards and engage the rear groove 51.

Figure 8A:
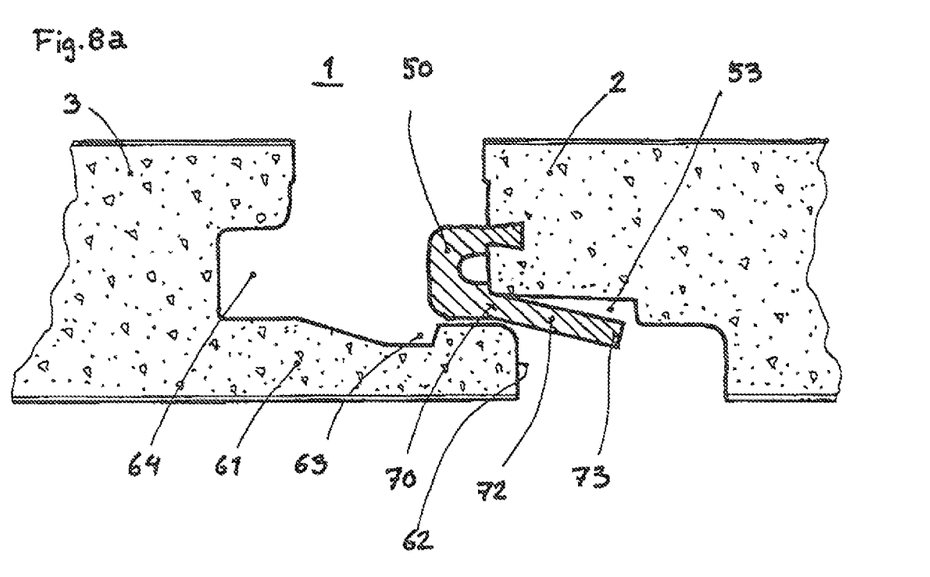
FIG. 8a-b shows a eighth embodiment of a joint 1 according to the invention.
Figure 8B:
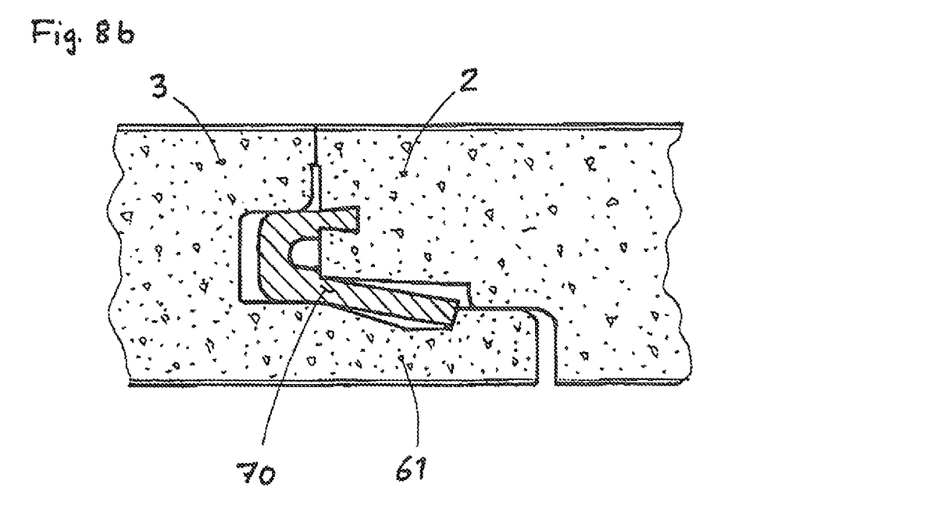

FIG. 8a-b shows in cross-section a joint 1 having a first edge 2 and a second edge 3 according to a eighth embodiment of the invention. FIG. 8a shows the joint 1 just before the joining and FIG. 8b shows the joint 1 after assembly. The eighth embodiment is an alternative embodiment of the invention where the joint is assembled through horizontal motion. The joint 1 have a first edge 2 and a second edge 3 wherein the first edge 2 is provided with a tongue 50 and a rear depression 53. The second edge 3 is provided with a lower cheek 61 having a distal end 62, an inner locking groove 63 and a tongue groove 64. A moveable locking member 70 is arranged on first edge 2. The moveable locking member 70 have a maneuvering cheek 72 and an outer locking tongue 73. As said above the second edge 3 is intended to join with the first edge 2 through horizontal motion according to this, eighth embodiment of the invention. The outer locking tongue 73 is urged upwards into the rear depression 53 during the assembly. It will then snap down into engagement with inner locking groove 63 once in the fully assembled position.

Figure 9:
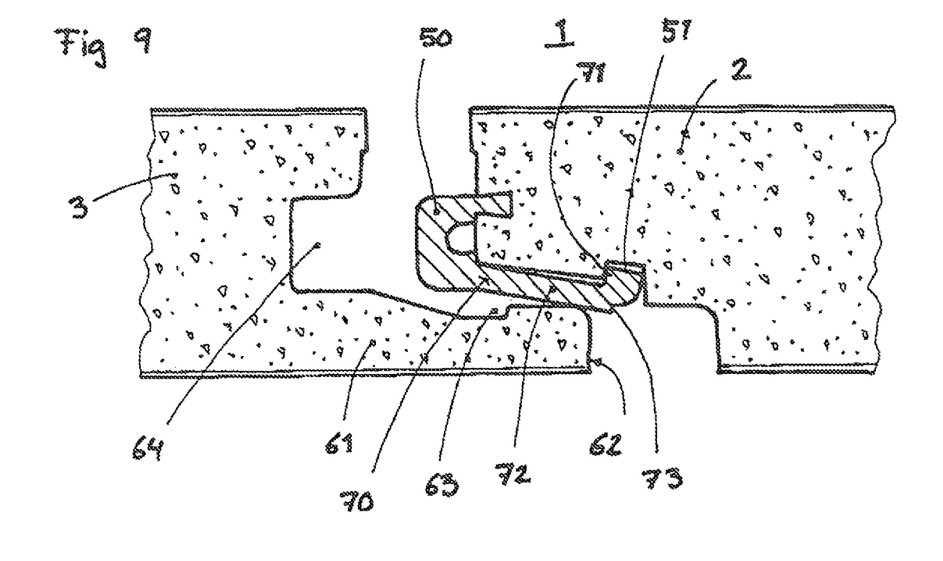
FIG. 9 shows a ninth embodiment of a joint 1 according to the invention

FIG. 9 shows in cross-section a joint 1 having a first edge 2 and a second edge 3 according to a ninth embodiment of the invention. FIG. 9 shows the joint 1 just before the joining. The ninth embodiment is an alternative embodiment of the invention where the joint is assembled through horizontal motion. The joint 1 have a first edge 2 and a second edge 3 wherein the first edge 2 is provided with a tongue 50 and a rear groove 51. The second edge 3 is provided with a lower cheek 61 having a distal end 62, a inner locking groove 63 and a tongue groove 64. A moveable locking member 70 is arranged an the first edge 2. The moveable locking member 70 have an inner locking tongue 71, a maneuvering cheek 72 and an outer locking tongue 73. As said above the second edge 3 is intended to join with the first edge 2 through horizontal motion according to this, ninth embodiment of the invention. The outer locking tongue 73 and the inner locking tongue 71 are urged upwards during the assembly. The outer locking tongue 73 will then snap down into engagement with inner locking groove 63 once in the fully assembled position.

Figure 10A:
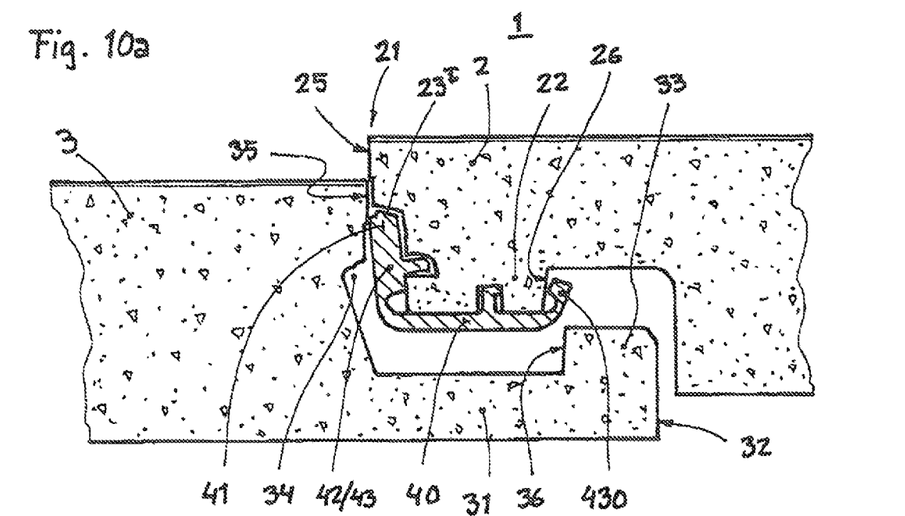
FIG. 10a-b shows a tenth embodiment of a joint 1 according to the invention.
Figure 10B:
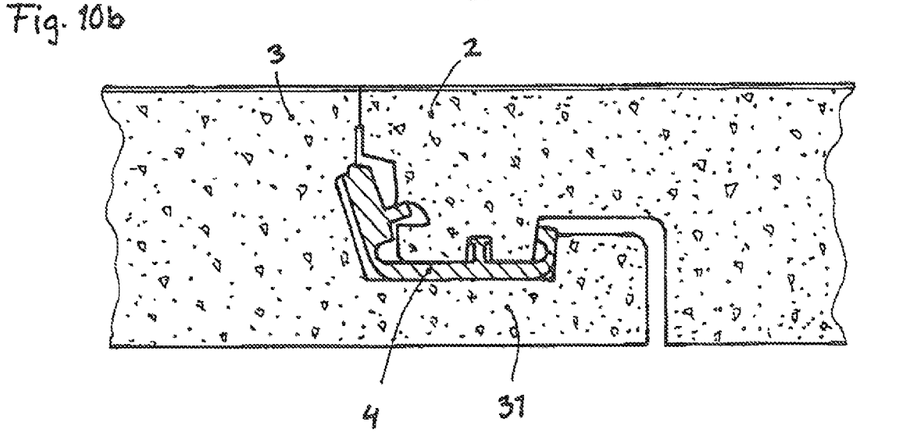

FIG. 10a-b shows in cross-section a joint 1 having a first edge 2 and a second edge 3 according to a tenth embodiment of the invention. FIG. 10a shows the joint 1 just before the joining and FIG. 10b shows the joint 1 after assembly. The first edge 2 is provided with a distal edge 21 and a downwards protruding heel 22. The distal edge 21 is further provided with an upper joint edge 25 beneath which an undercut space $23^1$ is arranged. The second edge 3 is provided with a lower cheek 31 having a distal end 32 at which an upwards protruding lower cheek heel 33 is arranged. The second edge 3 is further provided with an upper joining edge 35 beneath which an undercut 34 is arranged. A moveable locking element 40 is arranged in the space created by the undercut space $23^1$. The moveable locking element 40 have a locking tongue 41, a locking tongue leg 42 also acting as a maneuvering leg 43. The second edge 3 is intended to join with the first edge 2 through vertical motion. The lower cheek heel 33 have a front face 36 while the downwards protruding heel 22 have a rear face 26. The lower cheek heel 33 have a front face 36 while the downwards protruding heel 22 have a rear face 26 and the moveable locking element 40 have a face section 430. The front face 36 and the rear face 26 are intended to interact, having a face section 430 in an intermediate position. The interaction results in the upper joint edge 25 and the upper joining edge 35 being urged together in an assembled joint 1. The locking tongue 41 will engage the undercut 34 when the edges 2 and 3 respectively are fully assembled.

The invention is not limited by the embodiments shown as they can be varied in different ways within the scope of the invention, it is for example possible to use the different embodiments described in combination so that two opposite edges are provided with a joint selected from the herein described embodiments while the remaining edges are provided with another type of joint.

What is claimed is:
1. A floor panel system comprising at least two panels, each panel of the at least two panels having at least one pair of opposite edges, defining a first edge and a second edge, said first and second edges being configured such that two of said at least two panels can be coupled to each other thereby forming a joint between the at least two panels;
   wherein the first edge is provided with an upper cheek having a distal end and a downwards protruding heel;
   wherein the second edge is provided with a lower cheek having a distal end upon which an upwards protruding heel is arranged;
   wherein in a coupled condition of two of the at least two panels the downwards protruding heel grips behind the upwards protruding heel so as to provide a locking in horizontal direction;
   wherein said joint includes a moveable locking element comprising a locking tongue for vertical locking, a maneuvering element, and a movable portion connecting the maneuvering element with the locking tongue, said movable portion being configured to move in response to a movement of the maneuvering element, wherein the movement of the movable portion eventually results in displacement of said locking tongue;
   wherein said joint further includes a groove for receiving said locking tongue, said groove and locking tongue being provided at respective opposite edges, and said locking tongue being displaceable and insertable into the groove in a lateral direction in respect to the at least two panels, to thereby provide said vertical locking;

wherein said joint allows the first edge of one of the at least two panels and the second edge of an adjacent panel of the at least two panels to be joined through relative vertical motion of the at least two panels, wherein one of the at least two panels viewed in cross-section is substantially vertically lowered with respect to an other of the at least two panels;

wherein the locking tongue eventually as a result of exerting pressure onto the maneuvering element via the movable portion connecting the maneuvering element with the locking tongue is displaced by said vertical motion when two edges of the adjacent at least two panels are moved towards each other by the substantial vertical lowering of one panel of the at least two panels with respect to the other of the at least two panels; and wherein the movable locking element is configured such that during joining a resilient action takes place that urges the locking tongue into the groove, to thereby realize said vertical locking between the at least two panels in a coupled condition.

2. The floor panel system of claim 1, wherein the resilient action is caused by the fact that during said vertical movement the downwards protruding heel is urged in between the locking tongue and the maneuvering element.

3. The floor panel system of claim 1, wherein the downwards protruding heel presses on the maneuvering element urging the locking tongue to move forward and eventually engage the groove.

4. The floor panel system of claim 1, wherein said movable portion is formed as a locking tongue leg, said locking tongue leg at one end carrying the locking tongue.

5. The floor panel system of claim 4, wherein said locking tongue at an end opposite of said one end is connected with the maneuvering element.

6. The floor panel system of claim 5, wherein the maneuvering element comprises a maneuvering leg which is extended and as such is longer than the locking tongue leg.

7. The floor panel system of claim 1, wherein the movable locking element is made of a thermoplastic or thermosetting material.

8. The floor panel system of claim 1, wherein the movable locking element is configured such that the maneuvering element is located at one of said upper or lower cheeks so as to make contact with the other of said upper or lower cheeks upon joining the first and second edges of two of such floor the at least two panels.

9. The floor panel system of claim 1, said at least two panels having an upper side and a lower side, wherein the locking tongue is located closer to the upper side than the maneuvering element.

10. The floor panel system of claim 1, wherein the locking tongue and locking groove are located at a horizontal level above the upwards protruding heel, whereas the maneuvering element is located at the same level as the downwards and upwards protruding heels.

* * * * *